United States Patent Office 3,704,319
Patented Nov. 28, 1972

3,704,319
PRODUCTION OF CARBOXYLIC ACIDS
Paul H. Washecheck and Charles M. Stark, Ponca City, Okla., and Clyde E. Bishop, Indianapolis, Ind., assignors to Continental Oil Company, Ponca City, Okla.
No Drawing. Filed Feb. 22, 1971, Ser. No. 117,796
Int. Cl. C07c 51/24
U.S. Cl. 260—540
9 Claims

ABSTRACT OF THE DISCLOSURE

Straight chain ester compounds derived from alcohols and organic acids are oxidized by contact with nitric acid at a temperature of from about 40° C. to about 110° C. to yield straight chain carboxylic acids. At relatively high temperatures within the operative temperature range, good yields of carboxylic acids containing 1 less carbon atom than the alcohol moiety of the ester starting material are realized. As the temperature at which the nitric acid oxidation is carried out is decreased, the distribution of the carboxylic acid products derived from the alcohol moiety of the ester shifts to favor the production of carboxylic acids containing the same number of carbon atoms as contained by the alcohol moiety of the ester.

BACKGROUND OF THE INVENTION (1) Field of the invention

This invention relates to the production of straight chain carboxylic acids by the nitric acid oxidation of straight chain ester compounds.

(2) Brief description of the prior art

It is known that alkanol-alkanoic acid esters can be oxidized with nitric acid to produce aliphatic carboxylic acids. Processes of this type are disclosed in U.S. Patents 3,284,494 and 3,408,393 issued to Irwin F. Schoenbrunn. A similar teaching is also to be found in U.S. Patent 3,198,823. These patents deal specifically with the oxidation of the tertiary butyl ester of isobutylene with a lower alkanoic acid or a mineral acid. The oxidation is carried out by contact with nitric acid at temperatures between about 0° C. and 100° C. The end product sought by the oxidation is α-hydroxy isobutyric acid or α-sulphoxy isobutyric acid.

BRIEF DESCRIPTION OF THE PRESENT INVENTION

The present invention provides for the production of straight chain carboxylic acids by the oxidation of straight chain esters derived from an alcohol, and an alkanoic acid, by contact of such esters with nitric acid. The invention further entails the determination that selectivity within the several carboxylic acids produced upon oxidation of the ester can be controlled by appropriate control of the temperature at which the nitric acid oxidation is carried out. Thus, at relatively high temperatures, it has been determined that carboxylic acids containing 1 less carbon atom than the alcohol moiety of the ester starting material predominate in the carboxylic acid mixture produced by the reaction and derived from the alcohol portion of the ester. As the temperature is decreased, the amount of the carboxylic acid which contains the same number of carbon atoms as the alcohol moiety of the starting ester increases.

The oxidation reaction is carried out at temperatures between about 40° C. and about 110° C. At a temperature below about 60° C., the product mixture of carboxylic acids derived from the alcohol moiety of the starting ester material contains a predominance of the carboxylic acid having the same number of carbon atoms as the alcohol moiety of the ester. Above about 60° C., the amount of acid derived from the alcohol moiety and containing 1 less carbon atom than the alcohol moiety in the ester predominates in the product mixture.

An object of the invention is to provide a method of producing carboxylic acids from esters in a manner such that the distribution of carboxylic acids in the product mixture can be selectively controlled.

Additional objects and advantages will become apparent as the following detailed description of the invention is considered.

DETAILED DESCRIPTION OF A PREFERRED EMBODIMENT OF THE INVENTION

The ester starting materials useful in the present invention are preferably straight chain esters derived from alcohols and alkanoic acids. Most desirably, the esters are derived from alkanols containing from 4 to 30 carbon atoms, and from carboxylic acids containing from 2 to 10 carbon atoms. It is further preferred that the ester contain a number of carbon atoms not exceeding about 30, and most preferably not exceeding about 20 carbon atoms.

The nitric acid oxidation of the ester is carried out using from about 8 molar to about 22 molar nitric acid with from 10 to 16 molar acid being preferred. A suitable promoter is employed for use with the acid in the reaction system, and preferred promoter materials are vanadate or vanadium compounds such as ammonium vanadate and vanadium pentoxide. An amount of the promoter of from about 0.001 mole to about 0.05 mole of the promoter per mole of ester is preferred. In a batch or semibatch oxidation, it is also desirable, though not essential, in carrying out the reaction, that there be utilized, a reaction initiator selected from the group of materials which includes nitrite compounds and nitrogen dioxide. Preferably, from about 0.1 to about 10 moles of the initiator is used per mole of ester, with from about 1 to about 5 moles of the initiator per mole of ester being most suitable.

An important aspect of the present invention is the product selectivity which can be realized by selective control of the temperature at which the oxidation reaction is carried out. Thus, within the broad operative range of from about 40° C. to about 110° C., the lower temperatures within this range favor the production of a mixture of carboxylic acids derived from the alcohol moiety of the ester starting material, in which mixture, carboxylic acid containing the same number of carbon atoms as the alcohol moiety is predominant. As the temperature at which the reaction is carried out is increased, the amount of carboxylic acid yielded from the alcohol moiety, and in which there is 1 less carbon atom than in the alcohol moiety, increases, and the acid containing the same number of carbon atoms as the alcohol moiety decreases. Thus, at temperatures exceeding about 80° C., a mixture of carboxylic acids is derived from the alcohol moiety of the ester starting material, in which mixture at least 75 weight percent of the mixture is a carboxylic acid containing 1 less carbon atom than the alcohol moiety. At temperatures below about 60° C., the product mixture of carboxylic acids derived from the alcohol moiety of the ester contains a predominance of acid having the same number of carbon atoms as the alcohol moiety.

The time over which the oxidation reaction is carried out can vary widely, but is preferably from about 1 hour to about 4 hours. It is also preferred in carrying out the reaction that the ester material be added slowly to the nitric acid, vanadium compound promoter and the initiator material.

The following examples will illustrate the practice of the invention, but are not intended to be limiting with respect to the types of ester starting materials which may be employed, the temperatures at which the reaction may be carried out, the types of promoter and initiator materials which can be used, or the strength and amount of nitric acid which may be employed.

EXAMPLE 1

To a three-necked, round bottomed flask equipped with an addition funnel, thermometer and stirrer were added 500 ml. of 15.4 molar (70 percent) nitric acid, 0.23 gram of ammonium vanadate and 6.9 grams of sodium nitrite. The materials in the flask were then heated to the reaction temperature to be used for the run, and the ester to be oxidized was then added in drop-wise fashion through the addition funnel to the reaction mixture in the flask. In each of three runs, 25 grams of ester was employed. The total reaction time over which the reaction mixture was maintained at the reaction temperature, as measured from the commencement of addition of the ester to the reaction mixture, was 2 hours. The results obtained in the oxidations, as determined by gas chromatography, are reported in Table I.

TABLE I

| Temp, °C. | Ester starting material | Acids produced, g. | Neutral materials, g. | Acid distribution, wt. percent | | |
|---|---|---|---|---|---|---|
| | | | | $C_8$ | $C_7$ | $C_6$ |
| 80 | Ethyl octanoate | 21.4 | Trace | 81.18 | 0 | 0 |
| 40 | do | 8.07 | 1 21.0 | 85.59 | 0 | 0 |
| 80 | Octyl acetate | 18.3 | Trace | 8.79 | 75.30 | 9.02 |

1 Unreacted ester starting material as determined by infrared analysis.

EXAMPLE 2

500 ml. of 15.4 molar nitric acid was placed in a flask equipped as described in Example 1, along with 0.02 mole of ammonium vanadate and 1.2 moles of nitrogen dioxide. The contents of the flask were then heated to 60° C., and 46.3 grams of octyl acetate were added slowly to the flask through the addition funnel. The reaction was carried on for a period of 1 hour as measured from the time of commencement of addition of the ester.

Upon completion of the reaction, the product acids derived from the octyl moiety of the ester were isolated and were analyzed by gas chromatography. It was found that the total yield of acids derived from the octyl moiety of the ester was 26.3 grams. 10.2 grams of neutral or nonacid material were yielded in the reaction. Of the acids derived from the octyl moiety of the ester, 0.4 weight percent was determined to be hexanoic acid, 46.9 weight percent was determined to be heptanoic acid, and 50.4 weight percent was determined to be octanoic acid.

It will be seen from a comparison of the results obtained in the runs described in Example 1 as set forth in Table I, with the results obtained in carrying out the reaction described in Example 2, that an increase in reaction temperature results in an increase in the amount of the carboxylic acid (yielded from the alcohol moiety of the ester starting material) which contains 1 carbon atom less than the alcohol moiety of the ester starting material. Decreasing the reaction temperature, on the other hand, favors the production of carboxylic acid containing the same number of carbon atoms as the alcohol moiety of the ester starting material.

Although certain preferred embodiments of the present invention have been herein described, it is to be understood that various changes in reaction conditions and parameters, as well as in the reactants specifically identified, can be effected without departure from the basic principles of the invention. Changes and innovations of this type are therefore deemed to be circumscribed by the spirit and scope of the invention, except as the same may be necessarily limited by the appended claims or reasonable equivalents thereof.

What is claimed is:

1. A method for preparing straight chain alkanoic acids comprising contacting straight chain ester compounds derived from alkanols and alkanoic acids with about 8 to about 22 molar nitric acid at a temperature of from about 40° C. to about 110° C. in the presence of a vanadium compound promoter.

2. A method according to claim 1 wherein said reaction is carried out at a selected temperature within the range of from about 40° C. to below about 60° C. which favors the production of alkanoic carboxylic acids containing the same number of carbon atoms as the alcohol moiety of the straight chain ester reactant.

3. The method defined in claim 1 wherein the temperature which is selected is above about 65° C. up to about 110° C. whereby the production of alkanoic acid containing one less carbon atom than the alcohol moiety of the ester reactant is favored.

4. The method defined in claim 1 wherein said oxidation reaction is carried out utilizing sodium nitrite or nitrogen dioxide as a reaction initator.

5. A method for preparing straight chain carboxylic acid containing $n$ carbon atoms, where $n$ is a whole number of from 4 to 30, comprising
oxidizing with 8 to about 22 molar nitric acid at a temperature exceeding about 60° C. up to about 110° C. in the presence of a vanadium promoter, an ester compound derived from a straight chain alcohol and an organic acid, and having the formula

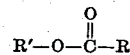

where R' is a straight chain alkyl group containing $n+1$ carbon atoms, and R is an alkyl group; and
separating from the reaction product, an alkanoic acid containing $n$ carbon atoms.

6. The method defined in claim 5 wherein the oxidation of the ester compound is carried out in the presence of sodium nitrite or nitrogen dioxide.

7. The method defined in claim 6 wherein said straight chain carboxylic acid is heptanoic acid, and said ester compound is derived from 1-octanol.

8. The method defined in claim 5 wherein the nitric acid utilized has a strength of from about 10 molar to about 16 molar.

9. The method defined in claim 8 wherein the oxidation with nitric acid is carried out at a temperature from about 80° C. up to about 110° C.

References Cited

UNITED STATES PATENTS

| 3,198,823 | 8/1965 | Akabayashi et al. | 260—535 |
| 3,284,494 | 11/1966 | Schoenbrunn | 260—535 |
| 3,408,393 | 10/1968 | Schoenbrunn | 260—535 |

VIVIAN GARNER, Primary Examiner

U.S. Cl. X.R.

260—413